United States Patent
Ohrui et al.

(10) Patent No.: US 11,459,019 B2
(45) Date of Patent: Oct. 4, 2022

(54) VEHICLE STEERING APPARATUS

(71) Applicant: Toyota Jidosha Kabushiki Kaisha, Toyota (JP)

(72) Inventors: Masahiro Ohrui, Toyota (JP); Akira Kaneko, Toyota (JP); Akihiro Harada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/340,857

(22) Filed: Jun. 7, 2021

(65) Prior Publication Data
US 2021/0394815 A1    Dec. 23, 2021

(30) Foreign Application Priority Data
Jun. 23, 2020   (JP) .............................. JP2020-108207

(51) Int. Cl.
*B62D 1/187*  (2006.01)
*B62D 1/184*  (2006.01)
*B62D 1/181*  (2006.01)

(52) U.S. Cl.
CPC .............. *B62D 1/187* (2013.01); *B62D 1/181* (2013.01); *B62D 1/184* (2013.01)

(58) Field of Classification Search
CPC ......... B62D 1/187; B62D 1/181; B62D 1/184
See application file for complete search history.

(56) References Cited

U.S. PATENT DOCUMENTS

| | | | | |
|---|---|---|---|---|
| 7,455,319 B2 * | 11/2008 | Haglund | ................ | B62D 1/197 280/775 |
| 10,988,161 B2 * | 4/2021 | Krstic | ................... | B62D 1/189 |
| 2007/0273130 A1 * | 11/2007 | Cartwright | ............ | B62D 1/184 280/731 |

FOREIGN PATENT DOCUMENTS

| | | | | |
|---|---|---|---|---|
| CN | 113071556 A | * | 7/2021 | ............ B60K 35/00 |
| DE | 202004017086 U1 | * | 3/2005 | ............ B62D 1/181 |
| DE | 102021114296 A1 | * | 12/2021 | ............ B62D 1/181 |
| EP | 1386820 A1 | * | 2/2004 | ............ B62D 1/181 |
| JP | 2002-002500 A | | 1/2002 | |
| JP | 2004-249854 A | | 9/2004 | |
| JP | 2006-082705 A | | 3/2006 | |
| WO | WO-03020572 A1 | * | 3/2003 | ......... B60R 25/0227 |
| WO | WO-2020043387 A1 | * | 3/2020 | ............ B62D 1/181 |

* cited by examiner

*Primary Examiner* — Drew J Brown
(74) *Attorney, Agent, or Firm* — Dinsmore & Shohl LLP (57) ABSTRACT

A vehicle steering apparatus, including: a steering column; a link member; an actuator including: a vehicle body side engaging portion, and a link side engaging portion, and when operated, the actuator changing a spacing between the vehicle body side engaging portion and the link side engaging portion, and swinging the steering column between the first position and the second position; a steering support that supports the steering column from the vehicle lower side in a state in which the steering column is disposed at the first position; and a clamp member provided at the link member, the clamp member being engaged with the steering support in the state in which the steering column is disposed at the first position, and the clamp member moving away from the steering support when the steering column is to swing from the first position toward the second position.

6 Claims, 12 Drawing Sheets

VEHICLE STEERING APPARATUS

CROSS-REFERENCE TO RELATED APPLICATION

This application is based on and claims priority under 35 USC 119 from Japanese Patent Application No. 2020-108207 filed on Jun. 23, 2020, the disclosure of which is incorporated by reference herein.

BACKGROUND

Technical Field

The present disclosure relates to a steering apparatus for a vehicle.

Related Art

Raising a steering column when an occupant of a driver seat of a vehicle is embarking or disembarking, to improve ease of embarkation or disembarkation for the occupant of the driver seat, has been called for. When a raising/lowering amount of a steering column is large, it may not be possible to achieve this with a conventional tilting mechanism. Thus, there is a need to provide a novel mechanism (for example, see Japanese Patent Application Laid-Open (JP-A) No. 2006-082705).

If this mechanism has a structure in which a mechanism that raises and lowers the steering column and a mechanism that locks the steering column are driven by separate actuators, peripheral equipment of the steering column is greater in size and is inferior in ease of vehicle installation.

SUMMARY

In consideration of the circumstances described above, an object of the present disclosure is to provide a steering apparatus for a vehicle in which raising and lowering of a steering column and locking of the steering column are implemented by a single actuator.

A vehicle steering apparatus according to a first aspect includes: a steering column that is supported swingably between a first position and a second position at a vehicle upper side relative to the first position; a link member that is supported by the steering column and is swingable relative to the steering column; an actuator including: a vehicle body side engaging portion that is engaged with a vehicle body side, and a link side engaging portion that is engaged with the link member, and when operated, the actuator changing a spacing between the vehicle body side engaging portion and the link side engaging portion, and swinging the steering column between the first position and the second position; a steering support that supports the steering column from the vehicle lower side in a state in which the steering column is disposed at the first position; and a clamp member provided at the link member, the clamp member being engaged with the steering support in the state in which the steering column is disposed at the first position, and the clamp member moving away from the steering support when the steering column is to swing from the first position toward the second position.

According to the vehicle steering apparatus according to the first aspect, when the actuator is operated, the spacing between the vehicle body side engaging portion and the link side engaging portion of the actuator changes. As a result, the steering column swings between the first position and the second position. In the state in which the steering column is disposed at the first position, the steering column is supported from the vehicle lower side thereof by the steering support. Furthermore, in the state in which the steering column is disposed at the first position, the clamp member provided at the link member is engaged with the steering support. Consequently, swinging of the link member relative to the steering column is restricted, and swinging of the steering column is restricted (locked). Thus, according to the vehicle steering apparatus according to the first aspect, raising and lowering of the steering column and locking of the steering column may be implemented by the single actuator.

In a vehicle steering apparatus according to a second aspect, in the vehicle steering apparatus according to the first aspect, in a case in which operation of the actuator continues in a state in which the engagement of the clamp member with the steering support is completed, the link member deforms by bending.

According to the vehicle steering apparatus according to the second aspect, variations in dimensional precision of members in the vicinity of the link member may be absorbed by the link member deforming by bending as described above. Moreover, a sense of firmness when a steering wheel supported by the steering column is operated may be a required sense of firmness.

In a vehicle steering apparatus according to a third aspect, in the vehicle steering apparatus according to the first aspect or second aspect, wherein: one of a positioning protrusion portion or a positioning hole portion is provided at the steering support and the other of the positioning protrusion portion or the positioning hole portion is provided at the steering column, the positioning protrusion portion being formed in one of a truncated cone shape or a cone shape, which shape tapers toward a distal end side of the positioning protrusion portion in a protrusion direction thereof, and an inner periphery edge of the positioning hole portion being formed in a circular shape, and when the steering column swings from the second position side toward the first position, the positioning protrusion portion enters into the positioning hole portion.

According to the vehicle steering apparatus according to the third aspect, when the steering column is swinging from the second position side to the first position side, the positioning protrusion portion enters into the positioning hole portion. Consequently, a position of the steering column when the steering column is disposed at the first position may be restricted by the positioning protrusion portion and the positioning hole portion.

In a vehicle steering apparatus according to a fourth aspect, the vehicle steering apparatus according to any one of the first to third aspects further includes: a guide member including a guide face that is disposed so as to oppose a portion of the link member when the steering column is swinging between the first position and the second position; and a swinging restriction portion provided at the link member, wherein, in a state in which the steering column is disposed between the first position and the second position, the swinging restriction portion abuts against the guide face and swinging of the steering column is restricted.

According to the vehicle steering apparatus according to the fourth aspect, if operation of the actuator is stopped in a state in which the steering column is disposed between the first position and the second position, swinging of the steering column may be restricted by the swinging restriction portion abutting against the guide face of the guide member.

In a vehicle steering apparatus according to a fifth aspect, in the vehicle steering apparatus according to the fourth aspect, wherein: the guide member includes a stopper portion that is disposed so as to oppose the swinging restriction portion when the steering column is disposed at the second position, and the swinging restriction portion abuts against the stopper portion and restricts swinging of the steering column toward an opposite side of the second position from a side thereof at which the first position is located.

According to the vehicle steering apparatus according to the fifth aspect, because the stopper portion described above is provided at the guide member, the steering column disposed at the second position may be restricted from swinging to the opposite side of the second position from the side at which the first position is located (to the vehicle upper side).

In a vehicle steering apparatus according to the present disclosure, raising and lowering of a steering column and locking of the steering column may be implemented by a single actuator.

BRIEF DESCRIPTION OF THE DRAWINGS

Exemplary embodiments of the present disclosure will be described in detail based on the following figures, wherein.

DETAILED DESCRIPTION

First Exemplary Embodiment

A steering apparatus for a vehicle according to the first exemplary embodiment is described with reference to FIG. 1 to FIG. 7. An arrow FR that is shown as appropriate in the drawings indicates a vehicle front side, an arrow UP indicates a vehicle upper side, and an arrow RH indicates a vehicle right side. Below, where descriptions are given simply using the directions front, rear, upper, lower, left and right, unless otherwise specified, these represent front and rear in the vehicle front-and-rear direction, upper and lower in the vehicle vertical direction, and left and right in the vehicle width direction when facing in a progress direction.

—Structures—

Vehicle Steering Apparatus (General Structure)

General structure of a vehicle steering apparatus 10 is described.

Figure 1:
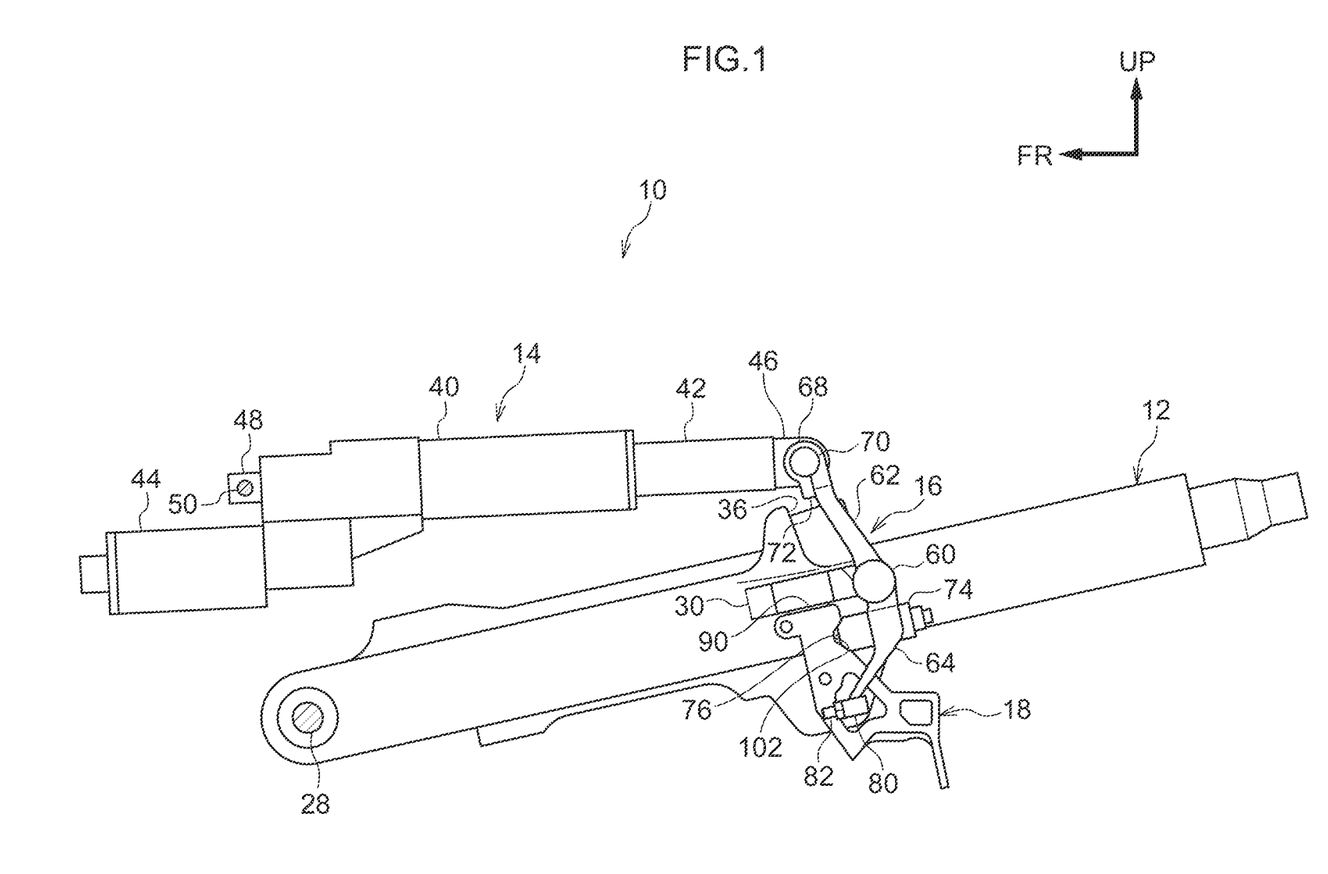
FIG. 1 is a side view showing a state in which a steering column of a vehicle steering apparatus according to a first exemplary embodiment is locked at a driving position (a dead bottom point)
Figure 3:
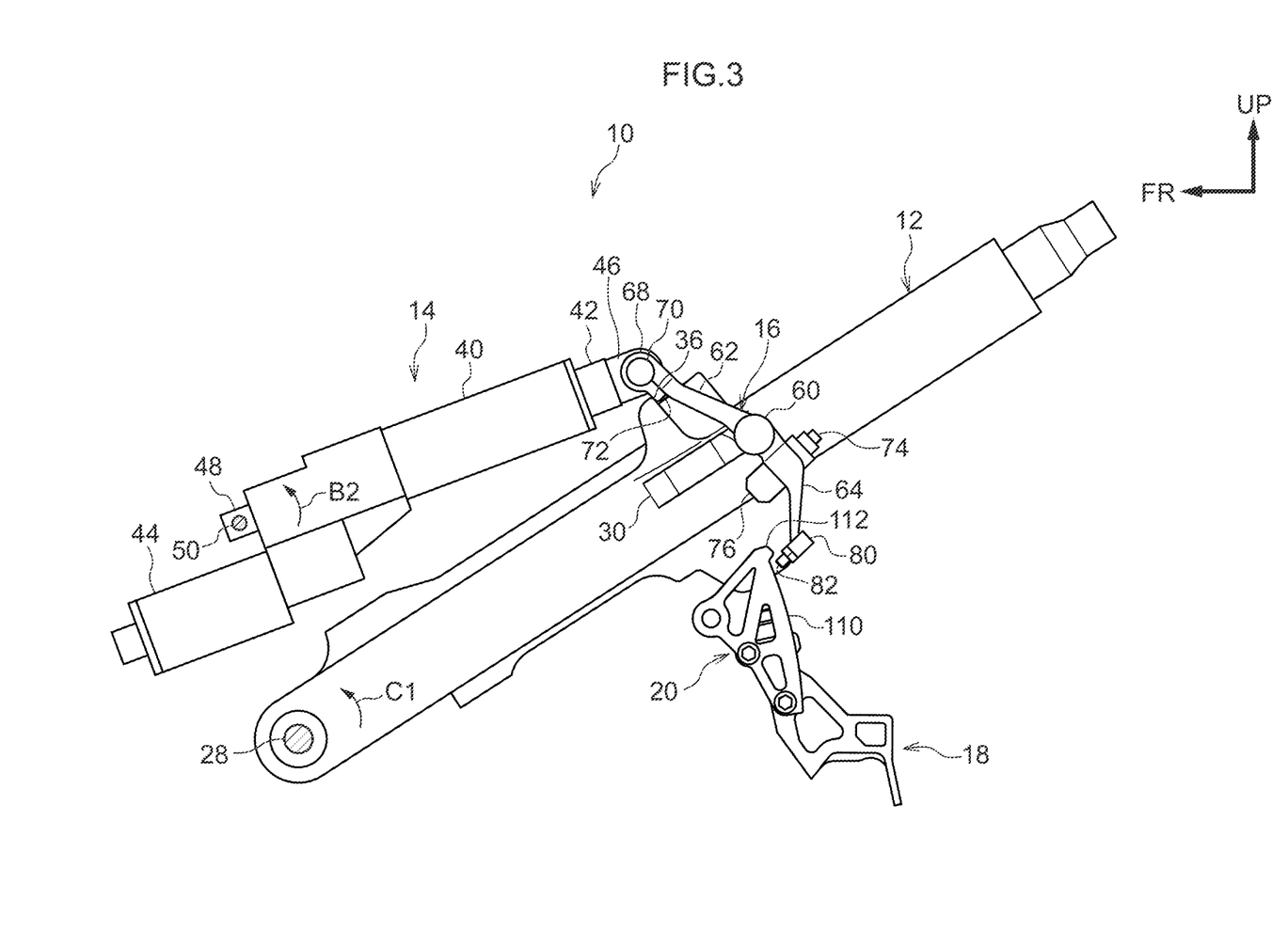
FIG. 3 is a side view showing a state in which the steering column of the vehicle steering apparatus according to the first exemplary embodiment is at an embarkation/disembarkation position (a dead top point)

As shown in FIG. 1, the vehicle steering apparatus 10 includes a steering column 12, an actuator 14, a link member 16, a steering support 18 and a guide member 20 (see FIG. 3).

As shown in FIG. 1, the steering column 12 extends in the vehicle front-and-rear direction. A steering shaft is inserted inside the steering column 12.

One end of the steering column 12 at the vehicle front side thereof is supported by a bracket attached at the vehicle body side, which is not shown in the drawings, via a column swinging axle 28 that extends in the vehicle width direction. That is, the steering column 12 is structured to be swingable in the vertical direction about the column swinging axle 28.

A pair of seating portions 30 (one of which is not shown in the drawings) are provided protruding to both sides of the steering column 12 from a vehicle front-and-rear direction central portion of the steering column 12. When the steering column 12 is at a driving position (a first position, which is a dead bottom point), which is described below, the seating portions 30 are seated on the steering support 18. A penetrating hole 32 (see FIG. 5 and FIG. 6) is formed in each seating portion 30. The penetrating hole 32 serves as a positioning hole portion that is formed in a hole portion shape corresponding with a truncated cone shape of a taper cone 92, which is described below. An attachment recess portion 34 is formed at the vehicle rear side of the seating portion 30. A rotation center portion 60, which is described below, of the link member 16 is axially supported at the attachment recess portion 34.

Figure 5:
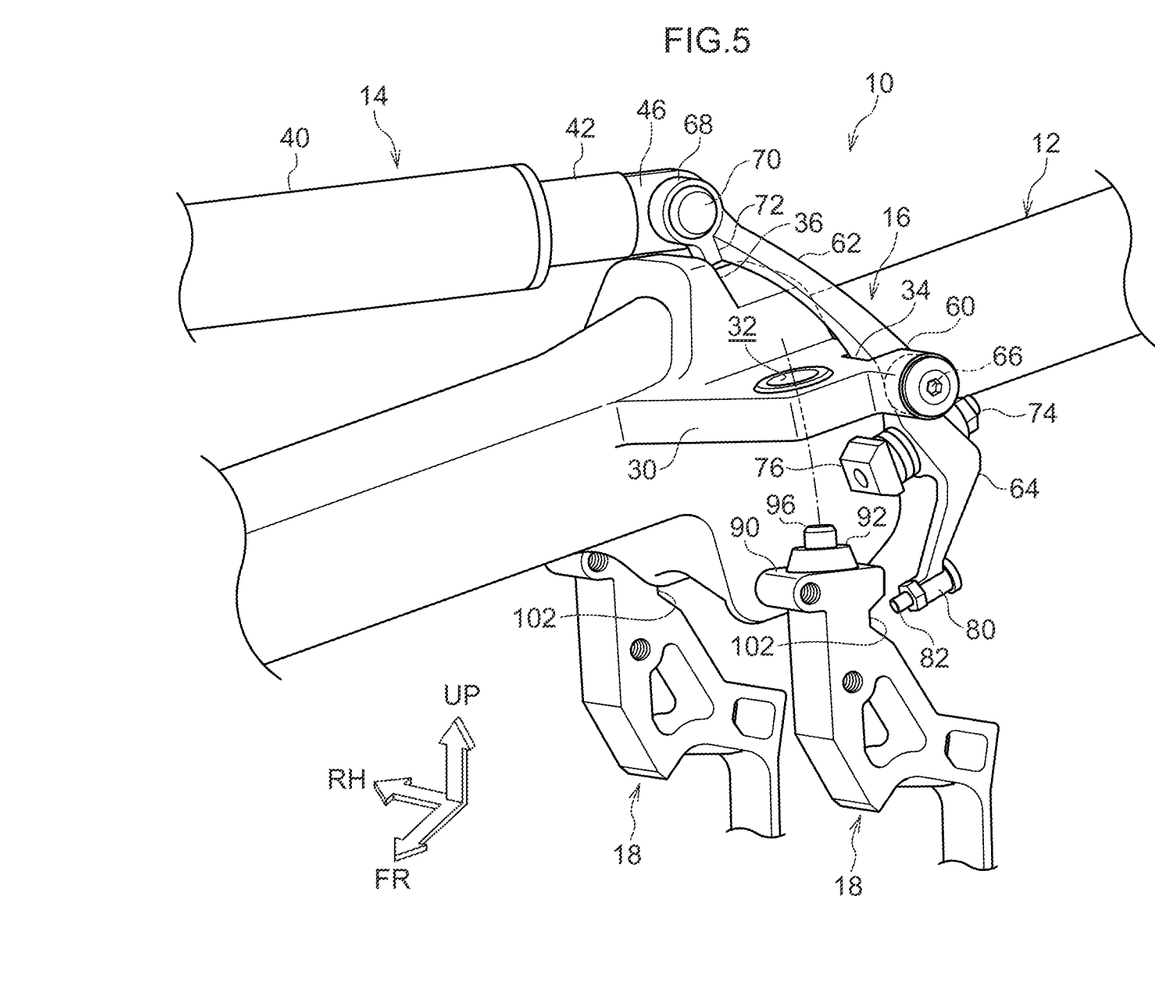
FIG. 5 is a perspective view showing the state in which the steering column of the vehicle steering apparatus according to the first exemplary embodiment is unlocked at the driving position (the dead bottom point)

As shown in FIG. 1 and FIG. 5, a stopper portion 36 is formed protruding upward from the steering column 12 at the upper side of the seating portion. One end side of the link member 16 abuts against the stopper portion 36.

As shown in FIG. 1, the actuator 14, which is provided at the upper side of the steering column 12, includes a cylinder body 40, a rod 42 and a driving motor 44. The cylinder body 40 extends substantially in the vehicle front-and-rear direction. The rod 42 projects to the vehicle rear side from a vehicle rear side end portion of the cylinder body 40. The rod 42 can be moved along the cylinder body 40 by driving of the driving motor 44. An engaging portion 46 in a plate shape is provided at a distal end of the rod 42. The engaging portion 46 serves as a link side engaging portion, which is engaged with the link member 16.

A bearing portion 48 that serves as a vehicle body side engaging portion is formed at a vehicle front side end portion of the cylinder body 40. The bearing portion 48 is supported, via an actuator swinging axle 50 that extends in the vehicle width direction, by a bracket attached at the vehicle body side, which is not shown in the drawings. Thus, the actuator 14 is structured to be swingable about the actuator swinging axle 50. A spacing between the bearing portion 48 and the engaging portion 46 is changed by the rod 42 being moved along the cylinder body 40 by driving force from the driving motor 44.

The link member 16 is formed so as to straddle the steering column 12. The link member 16 sandwiches the engaging portion 46 of the actuator 14 and is formed with left-and-right symmetry in the vehicle width direction. Only one side of the link member 16 is shown in FIG. 1; only the one side is described. The other side of the link member 16 is formed to be similar to the one side; detailed descriptions thereof are not given here.

As shown in FIG. 1, the link member 16 includes the rotation center portion 60, a first arm 62 that extends to one side (upward) from the rotation center portion 60, and a second arm 64 that extends to the other side (downward) from the rotation center portion 60.

As shown in FIG. 5, the rotation center portion 60 of the link member 16 is disposed in the attachment recess portion 34 of the seating portion 30 that is formed protruding from a side portion of the steering column 12. The rotation center portion 60 of the link member 16 is axially supported by a link turning axle 66 that extends in the vehicle width direction. Thus, the link members 16 (one of which is not shown in the drawings) are attached at both sides of the steering column 12 to be freely turnable (swingable) about the link turning axles 66 (the rotation center portions 60).

An attachment portion 68 with a substantially circular shape in side view is formed at a distal end (upper end) of the first arm 62 of the link member 16. The engaging portion 46 formed at the distal end of the rod 42 of the actuator 14 is sandwiched between the attachment portion 68 and another of the attachment portion (not shown in the drawings). An axle body 70 that extends in the vehicle direction is inserted through the engaging portion 46 from the attachment portion 68 to the another attachment portion. Thus, the first arm 62 is freely turnable (swingable) relative to the engaging portion 46 of the actuator 14.

An abutting portion 72 is formed projecting to the lower side from the attachment portion 68. The abutting portion 72 may be abutted against the stopper portion 36 formed at the steering column 12 when the link member 16 turns.

A clamp member 74 is attached at the side of the second arm 64 at which the rotation center portion 60 is disposed. An insertion portion 76 is formed at a vehicle front side end portion of the clamp member 74. The insertion portion 76 is inserted into (engaged with) a recess portion 102 of the steering support 18, which is described below. Taper faces are formed at the insertion portion 76 (see FIG. 5). The taper faces decrease in diameter toward the distal end of the insertion portion 76, corresponding with a shape of the recess portion 102.

A detent portion 80 that serves as a swinging restriction portion is provided at a distal end (lower end) of the second arm 64 of the link member 16. An abutting portion 82 in a circular rod shape is formed at a vehicle front side end portion of the detent portion 80. If the steering column 12 is lowered unusually far, the abutting portion 82 abuts against a guide face 110, which is described below, of the guide member 20. Thus, swinging of the link member 16 is restricted.

The first arm 62 and second arm 64 of the link member 16 are specified with dimensions and shapes to be deformable by bending, which is described below. That is, the first arm 62 and the second arm 64 feature flexibility.

Now, the steering support 18 that supports the steering column 12 is described. A pair of the steering support 18 (see FIG. 5) support the respective seating portions 30 (only one of which is shown in the drawings) that are formed protruding to both sides from the steering column 12.

Figure 6:
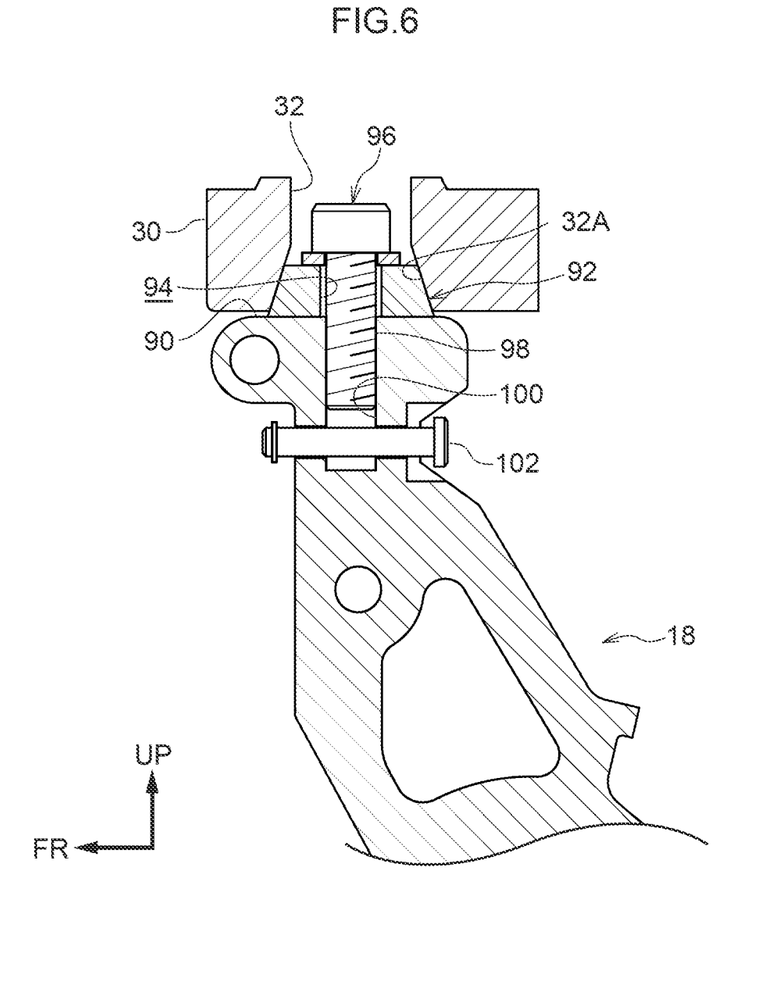
FIG. 6 is a sectional view cut along line A-A in FIG. 5.

As shown in FIG. 5 and FIG. 6, the taper cone 92, which serves as a positioning protrusion portion, is attached at a flat face portion 90 at the upper end of each steering support 18. The taper cone 92 is provided so as to protrude to the upper side from the flat face portion 90, and is formed in a truncated cone shape that decreases in diameter toward the upper side. An insertion hole 94 is formed at a central portion of the taper cone 92. The insertion hole 94 penetrates through the taper cone 92 in an axial direction thereof (a vertical direction).

As shown in FIG. 6, a threaded hole 100 is formed in the flat face portion 90 of the steering support 18. The taper cone 92 is fixed to the flat face portion 90 by a bolt 96 being inserted through the insertion hole 94 from above and a threaded portion 98 of the bolt 96 being screwed into the threaded hole 100.

The insertion hole 94 formed in the taper cone 92 is formed with a larger diameter than the threaded portion 98 of the bolt 96. Therefore, in a state in which the bolt 96 is provisionally fixed, the taper cone 92 may be moved on the flat face portion 90.

As shown in FIG. 6, the penetrating hole 32 formed in the seating portion 30 penetrates through the seating portion 30 vertically. Seen in the penetration direction of the penetrating hole 32, an inner periphery edge of the penetrating hole 32 is formed in a circular shape. A lower side of an inner periphery face of the penetrating hole 32 is formed as a taper face 32A. The taper face 32A increases in diameter toward the lower side. The taper face 32A is specified to have an inclination angle the same as an outer periphery face of the taper cone 92. Therefore, when the seating portion 30 is being seated on the flat face portion 90 of the steering support 18, the taper cone 92 enters into the penetrating hole 32 of the seating portion 30, and the taper face 32A of the penetrating hole 32 makes area contact with the outer periphery face of the taper cone 92.

The recess portion 102 is formed at the lower side of the steering support 18 relative to the flat face portion 90. The vehicle rear side of the recess portion 102 is open. The shape of the recess portion 102 corresponds with the shape of the insertion portion 76 of the clamp member 74.

As shown in FIG. 3, the guide member 20 is a plate-shaped member attached to an upper portion of each steering support 18. (The guide member 20 is shown only in FIG. 3, FIG. 4A and FIG. 4B, and is not shown in the other drawings.)

The guide member 20 is attached at the vehicle width direction outer side of the steering support 18 (the side thereof that is further from the steering column 12) by fastening at two locations at the upper side of the steering support 18. A vehicle width direction position of the guide member 20 matches a vehicle width direction position of the detent portion 80 that is attached at the distal end of the link member 16. A curved surface that extends from the upper side to the lower side is formed at the vehicle rear side of the guide member 20. This curved surface serves as the guide face 110, which is described below.

A protrusion portion 112 that serves as a stopper portion is formed protruding to the vehicle rear side from an upper end portion of the guide member 20 at the upper side of the guide face 110. When the steering column 12 reaches a dead top point that serves as a second position, the abutting portion 82 of the detent portion 80 of the link member 16 abuts against the protrusion portion 112.

Operation and Effects of the Present Exemplary Embodiment

Now, operation and effects of the vehicle steering apparatus 10 according to the present exemplary embodiment are described.

First, raising and lowering operations of the steering column 12 are described.

As shown in FIG. 1, when the steering column 12 is in a driving state, each seating portion 30 of the steering column 12 is seated on the flat face portion 90 of the steering support 18, and the taper cone 92 is inserted and tightly fitted into the penetrating hole 32 of the seating portion 30. Thus, the steering column 12 is fixed in a state in which the steering column 12 is positioned at predetermined positions of the steering supports 18 (the flat face portions 90).

Raising of the steering column 12 is prevented by the insertion portion 76 of the clamp member 74 of each link member 16 being inserted into and engaged with the recess portion 102 of the steering support 18. In other words, the steering column 12 is locked.

Figure 2:
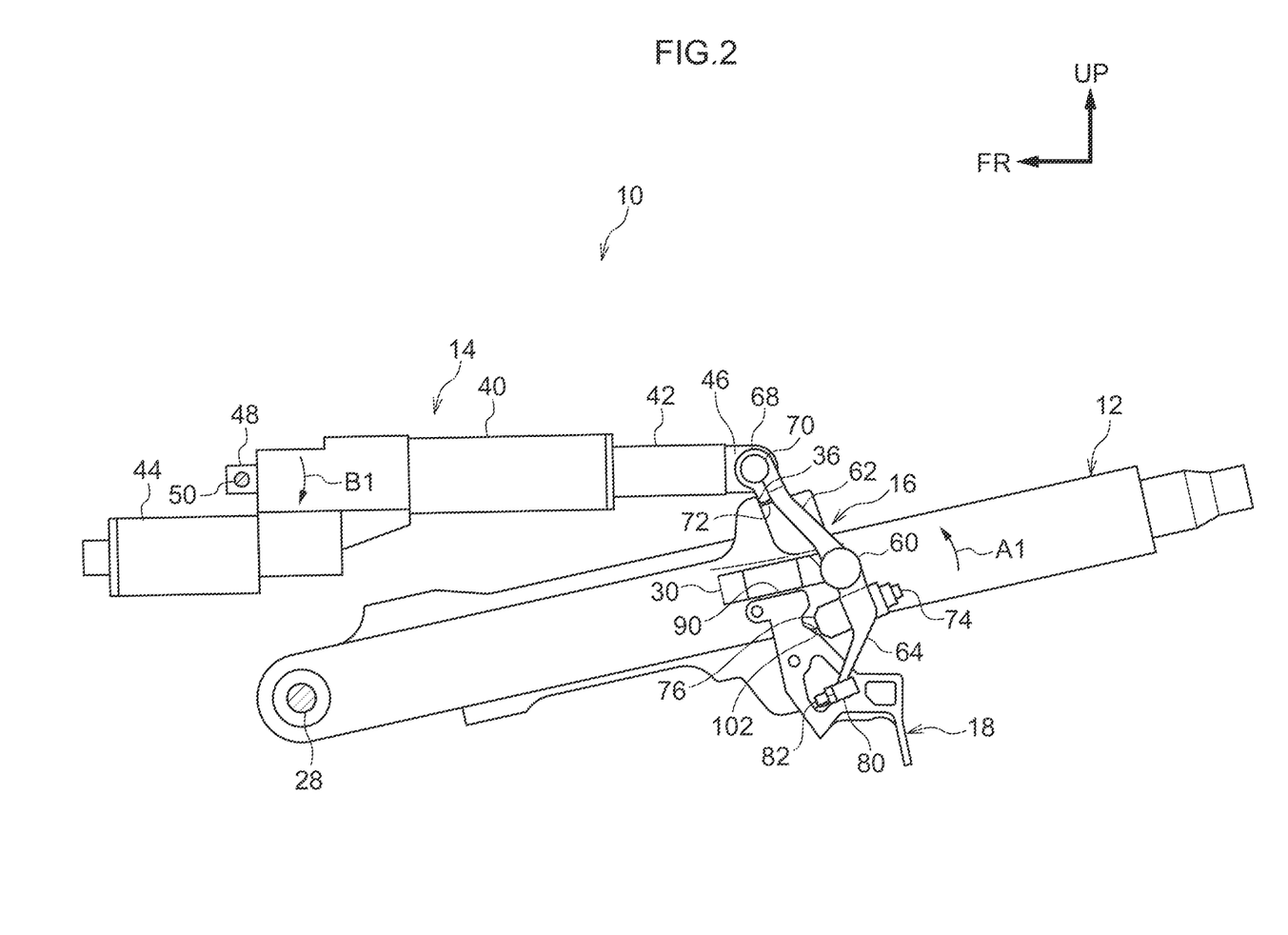
FIG. 2 is a side view showing a state in which the steering column of the vehicle steering apparatus according to the first exemplary embodiment is unlocked at the driving position (the dead bottom point)

When the driving motor 44 of the actuator 14 is operated in this state, the rod 42 retracts, the spacing between the bearing portion 48 and engaging portion 46 of the actuator 14 is decreased and, as shown in FIG. 2, the link member 16 turns about the rotation center portion 60 (the link turning axle 66; below, "about a pivot X") counterclockwise in the drawings (the direction of arrow A1 in FIG. 2). At this time, the actuator 14 turns about the actuator swinging axle 50 (below, "about a pivot Z") clockwise in the drawings (the direction of arrow B 1 in FIG. 2).

As a result, the insertion portion 76 of the clamp member 74 attached to the second arm 64 of the link member 16 disengages from the recess portion 102 of the steering support 18. That is, the locked state of the steering column 12 is unlocked, enabling raising of the steering column 12.

Then, the abutting portion 72 of the attachment portion 68 attached at the distal end of the first arm 62 of the link member 16 abuts against the stopper portion 36 formed protruding upward from the steering column 12, which stops the counterclockwise turning of the link member 16 about the pivot X.

When the rod 42 retracts further and the spacing between the bearing portion 48 and engaging portion 46 of the actuator 14 is decreased further, counterclockwise turning of the link member 16 about the pivot X is not possible. Therefore, as shown in FIG. 3, the steering column 12 turns counterclockwise in the drawings (see arrow C1 in FIG. 3) about the column swinging axle 28 (below, "about a pivot Y") and is raised.

Figure 4A:
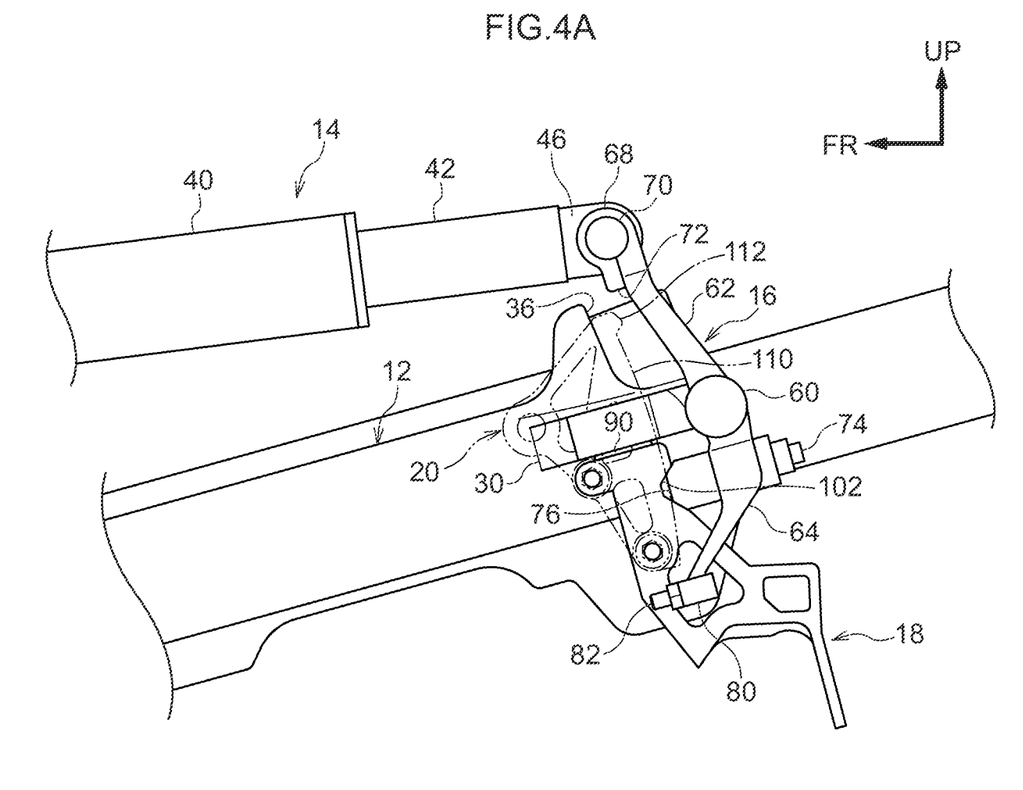
FIG. 4A is a magnified side view of principal portions showing the state in which the steering column of the vehicle steering apparatus according to the first exemplary embodiment is locked at the driving position (the dead bottom point)
Figure 4B:
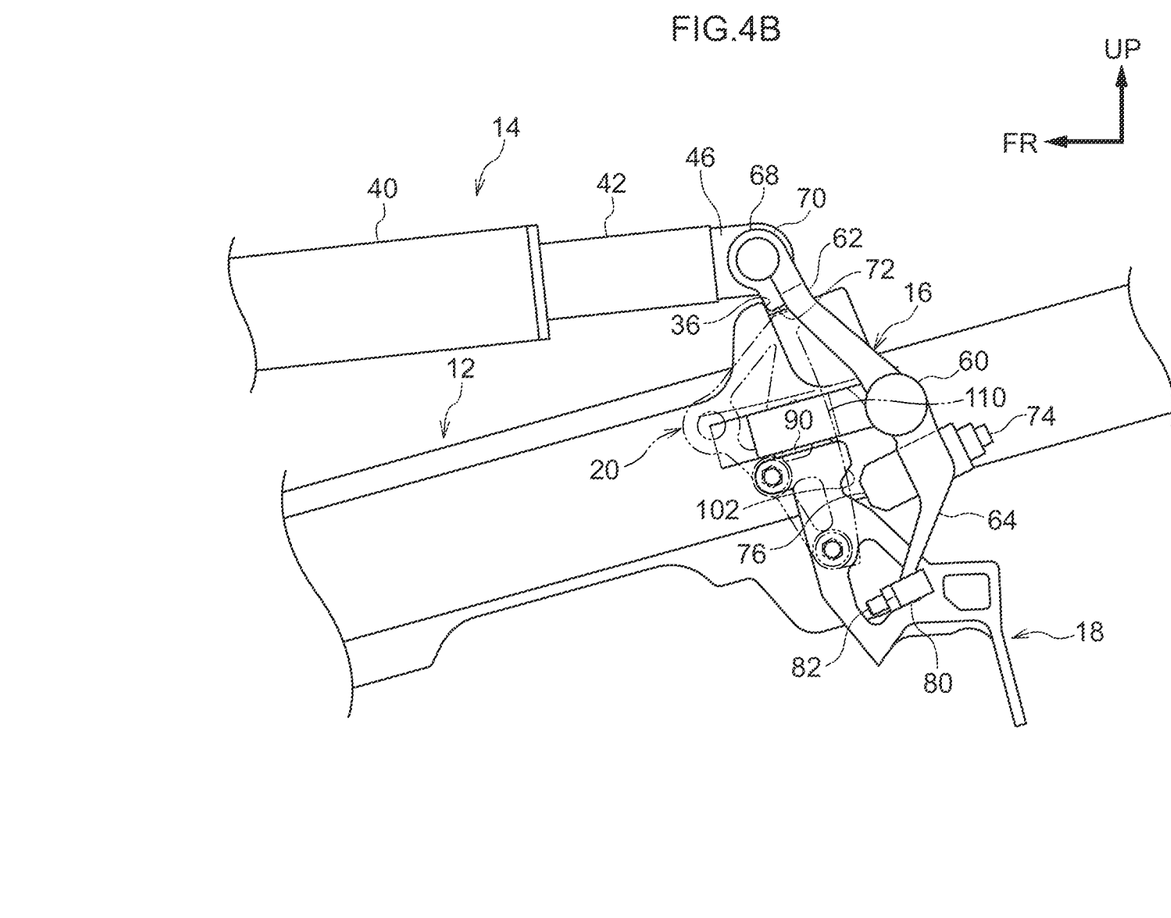
FIG. 4B is a magnified side view of principal portions showing the state in which the steering column of the vehicle steering apparatus according to the first exemplary embodiment is unlocked at the driving position (the dead bottom point)

During this process, because of the counterclockwise turning of the link member 16 about the pivot X, the detent portion 80 attached at the distal end (lower end) of the second arm 64 moves from the lower side of the guide member 20 (see FIG. 4A) to the vehicle rear side of the guide member 20 (see FIG. 4B). As a result, the detent portion 80 and the guide member 20, which are at the same position in the vehicle width direction, do not interfere due to the raising of the steering column 12.

Hence, because the steering column 12 is raised, an occupant sitting on a driver seat may easily disembark.

Now, lowering of the steering column 12 disposed at the dead top point is described.

When the driving motor 44 of the actuator 14 is operated, the rod 42 extends, the spacing between the bearing portion 48 and engaging portion 46 of the actuator 14 is increased and, as shown in FIG. 3, the steering column 12 turns under its own weight clockwise in the drawings (the opposite direction to arrow C1) about the pivot Y and is lowered.

As a result, as shown in FIG. 2 and FIG. 1, each seating portion 30 of the steering column 12 is seated on the flat face portion 90 of the steering support 18 (the steering column 12 reaches the dead bottom point). Thus, lowering of the steering column 12 is stopped.

At this time, as shown in FIG. 5 and FIG. 6, because the outer periphery face of the taper cone 92 attached to the flat face portion 90 makes area contact with the taper face 32A of the penetrating hole 32 of the seating portion 30, the steering column 12 is fixed in a state in which the steering column 12 is positioned at a predetermined position on the steering support 18 (the flat face portion 90).

When the actuator 14 is operated and the spacing between the bearing portion 48 and engaging portion 46 of the actuator 14 is increased further, because the lowering operation of the steering column 12 is completed as shown in FIG. 1, the link member 16 turns clockwise in the drawings (see the direction of arrow A1) about the pivot X, and the insertion portion 76 of the clamp member 74 enters into and engages with the recess portion 102 of the steering support 18. As a result, raising and lowering of the steering column 12 is disabled (the steering column 12 is locked).

Then, when the rod 42 is extended by operation of the actuator 14 and the spacing between the bearing portion 48 and engaging portion 46 of the actuator 14 is increased further, the first arm 62 and second arm 64 of the link member 16 that feature flexibility deform by bending. The insertion portion 76 of the clamp member 74 is pressed against the recess portion 102 of the steering support 18 by the bending of the first arm 62 and second arm 64. As a result, a sense of firmness of the steering column 12 is improved. Moreover, variations in dimensional precision of members in the vicinity of the link member 16 may be absorbed by the first arm 62 and second arm 64 deforming by bending.

Thus, at a time of raising of the steering column 12 of the vehicle steering apparatus 10, first, the link member 16 that is attached to be freely turnable relative to the steering column 12 turns and unlocks the locked state of the steering column 12. The turning of the link member 16 is stopped by the abutting portion 72 of the link member 16 abutting against the stopper portion 36 of the steering column 12. Thus, raising of the steering column 12 by the retraction of the rod 42 of the actuator 14 is enabled.

At a time of lowering of the steering column 12, when the rod 42 of the actuator 14 is extended, the steering column 12 is lowered by its own weight, is seated on the flat face portion 90 of the steering support 18, and reaches the dead bottom point (the driving position). When the lowering of the steering column 12 has stopped, the link member 16 is turned by the extension of the rod 42 of the actuator 14, and the insertion portion 76 of the clamp member 74 is tightly fitted into the recess portion 102 of the steering support 18, locking the steering column 12 (disabling raising and lowering).

That is, in the vehicle steering apparatus 10, locking and unlocking of the steering column 12 and raising and lowering operations of the steering column 12 may be implemented by the single actuator 14. Thus, raising and lowering operations and locking/unlocking of the steering column 12 may be implemented automatically even with a simplified equipment structure.

Because the distal end (upper end) of the first arm 62 of the link member 16 that is freely turnable about the pivot X relative to the steering column 12 is attached to the distal end of the rod 42 of the actuator 14, the link member 16 may be turned counterclockwise in the drawings and the insertion portion 76 of the clamp member 74 may be disengaged from the recess portion 102 of the steering support 18 simply by the rod 42 of the actuator 14 retracting. Thus, the locked state of the steering column 12 may be unlocked.

When the seating portion 30 of the steering column 12 is being seated on the flat face portion 90 of the steering support 18, the taper cone 92 attached to the flat face portion 90 is inserted into the penetrating hole 32 of the seating portion 30. The inclination angle of the taper face 32A of the penetrating hole 32 matches the inclination angle of the outer periphery face of the taper cone 92, so as to make area contact. Thus, the taper face 32A of the penetrating hole 32 and the outer periphery face of the taper cone 92 make area contact, and the steering column 12 is positioned accurately to front, rear, left and right relative to the steering support 18, that is, relative to the vehicle body.

As shown in FIG. 6, the insertion hole 94 of the taper cone 92 has a greater diameter than the threaded portion 98 of the bolt 96. Therefore, when the taper cone 92 is being attached to the flat face portion 90 of the steering support 18, first, the flat face portion 90 is provisionally fixed to the flat face portion 90 by the bolt 96, and the steering column 12 is lowered, inserting the taper cone 92 into the penetrating hole 32 of the seating portion 30. Thus, the taper cone 92 may be guided by the penetrating hole 32 to a precise position on the flat face portion 90.

In this state, a tool is inserted from above the penetrating hole 32 of the seating portion 30 and tightens the bolt 96 to finally fasten the bolt 96. Thus, the taper cone 92 may be accurately assembled to (positioned on) the flat face portion 90 of the steering support 18.

Figure 7:
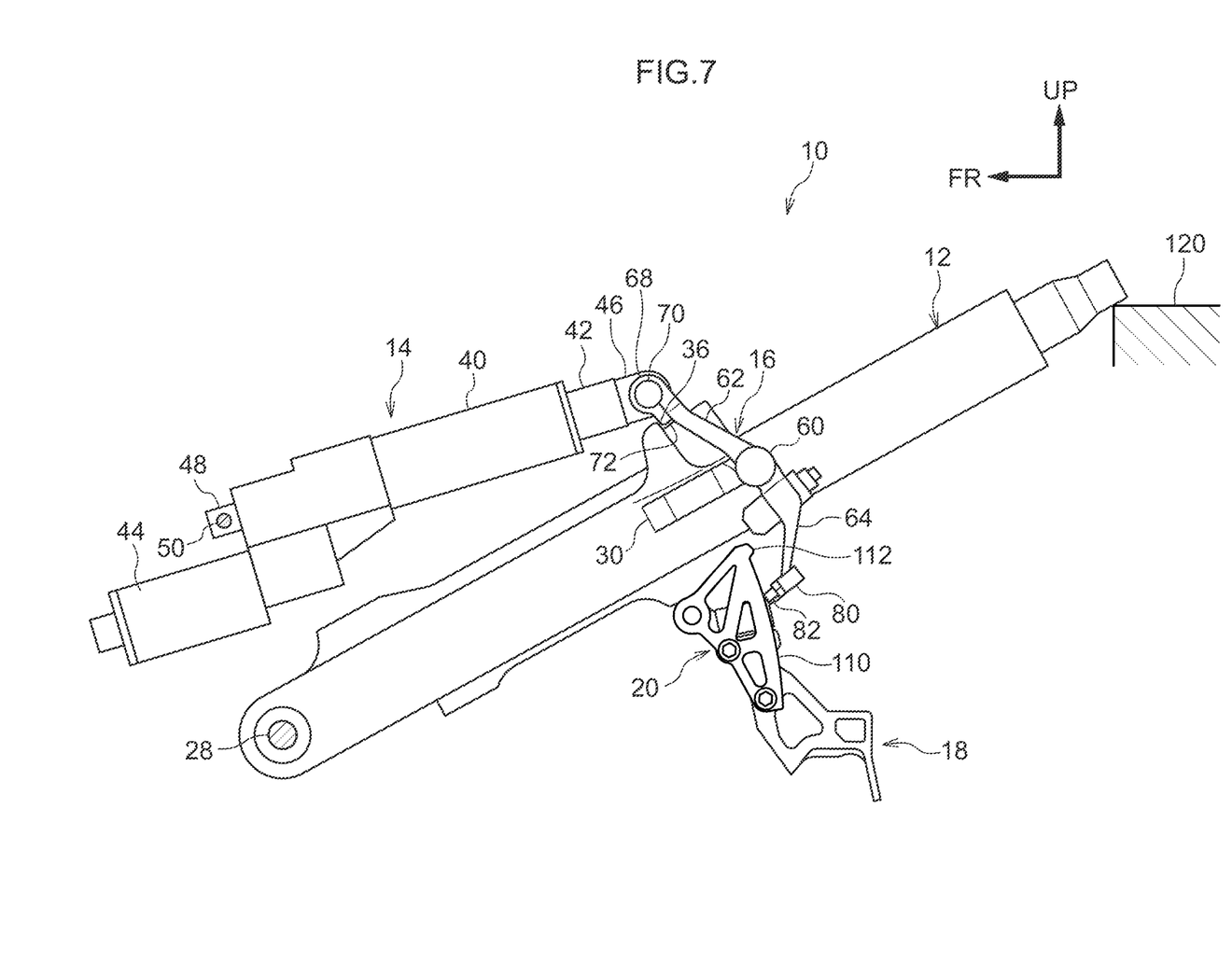
FIG. 7 is a side view showing a foreign body interference state when the steering column of the vehicle steering apparatus according to the first exemplary embodiment is being lowered.

As shown in FIG. 7, when the steering column 12 is being lowered from the dead top point, the lowering may be disabled before the steering column 12 reaches the dead bottom point by interference with a foreign body 120 such as a leg of an occupant, a piece of luggage or the like.

In this situation, as shown in FIG. 7, there is potential for the link member 16 to be turned clockwise about the pivot X by the extension of the rod 42 of the actuator 14. However, while the steering column 12 is moving from the dead top point toward the dead bottom point, the guide face 110 of the guide member 20 is disposed to the vehicle front of the abutting portion 82 of the detent portion 80 that is attached at the distal end (lower end) of the second arm 64 of the link member 16. Therefore, when the link member 16 turns due to the lowering of the steering column 12 being disabled, the abutting portion 82 of the detent portion 80 moves to the vehicle forward side in the drawings and abuts against the guide face 110. Thus, further turning of the link member 16 is blocked. That is, fitting of the steering support 18 into the recess portion 102 becoming impossible (locking of the steering column 12 becoming impossible) due to the link member 16 turning and the clamp member 74 turning clockwise in the drawings before the steering column 12 reaches the dead bottom point may be prevented.

In the state in which the steering column 12 is disposed at the dead top position as shown in FIG. 3, if an occupant acts to raise the steering column 12 further by hand, there is potential for the steering column 12 to be raised by turning of the link member 16 without the rod 42 of the actuator 14 extending or retracting.

However, the protrusion portion 112 that protrudes to the vehicle rear side is formed at the upper end of the guide face 110 of the guide member 20. Thus, the abutting portion 82 of the detent portion 80, which is provided at the lower end of the link member 16 attached to the steering column 12 that is disposed at the dead top point, abuts against the protrusion portion 112, which prevents turning of the link member 16. That is, raising of the steering column 12 beyond the dead top point is prevented.

Second Exemplary Embodiment

An example of a vehicle steering apparatus 200 according to a second exemplary embodiment is described with reference to FIG. 8 to FIG. 11. Structural elements that are substantially the same as in the vehicle steering apparatus 10 according to the first exemplary embodiment are assigned the same reference symbols and descriptions thereof are not given here. Only points that differ from the first exemplary embodiment are described.

—Structures—

In the vehicle steering apparatus 200, the actuator 14 is disposed below the steering column 12.

Figure 8:
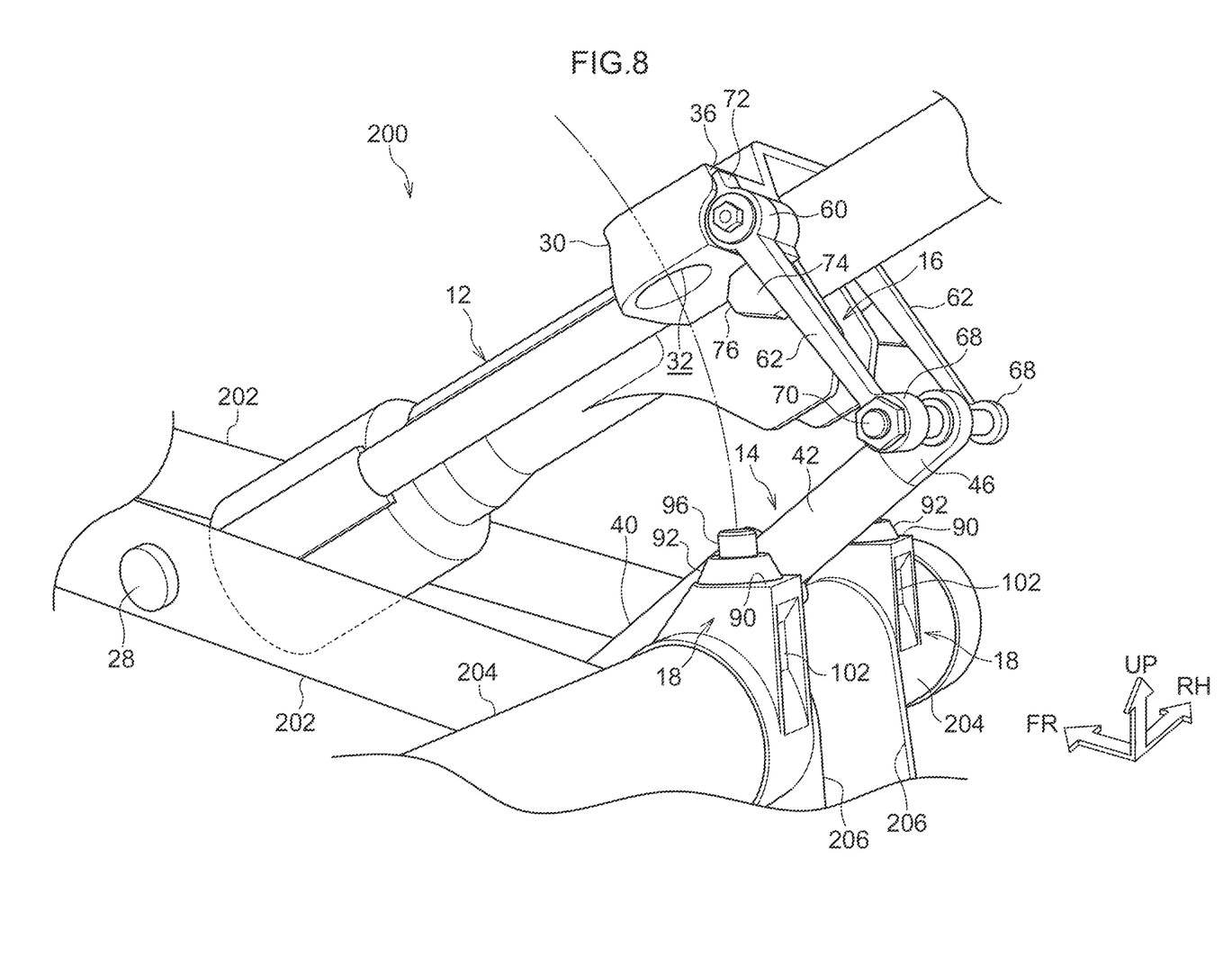
FIG. 8 is a perspective view of principal portions showing a state in which a steering column of a vehicle steering apparatus according to a second exemplary embodiment is at an embarkation/disembarkation position (a dead top point)
Figure 9:
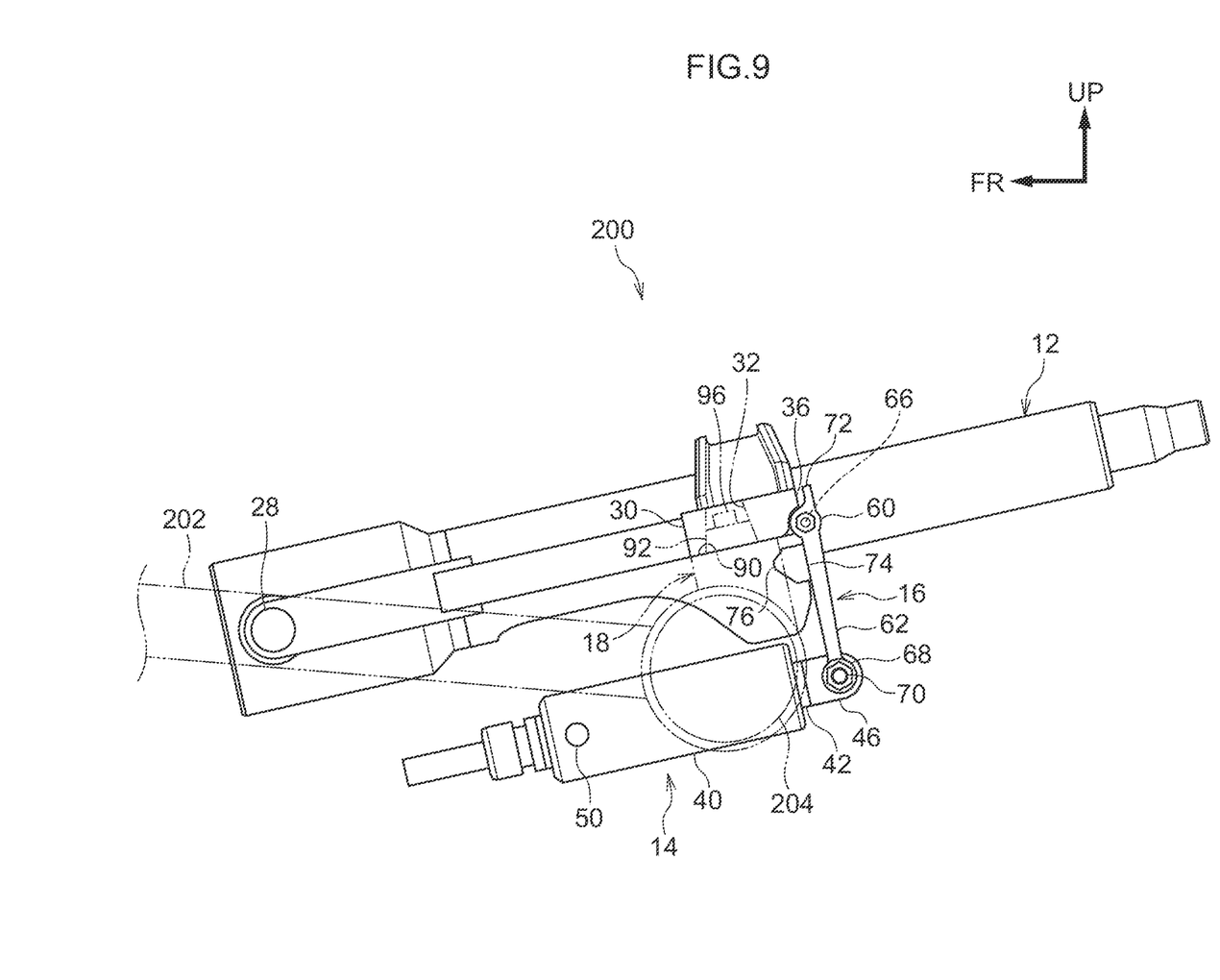
FIG. 9 is a side view showing a state in which the steering column of the vehicle steering apparatus according to the second exemplary embodiment is locked at a driving position (a dead bottom point)

As shown in FIG. 8 and FIG. 9, the steering column 12 is attached, via the column swinging axle 28, to be freely swingable relative to a pair of shafts 202 that extend in the vehicle front-and-rear direction.

The actuator 14 is disposed at the lower side of the steering column 12 and is freely swingably attached, via the actuator swinging axle 50, to a bracket attached at the vehicle body side, which is not shown in the drawings.

The link member 16 is freely swingable about the rotation center portions 60 (link turning axles 66) at both side faces of the steering column 12. Differently from the first exemplary embodiment, the link member 16 includes only each first arm 62 extending to the lower side from the rotation center portion 60 (to the side at which the rod 42 of the actuator 14 is disposed). The link member 16 is freely swingably attached to the engaging portion 46 of the rod 42 of the actuator 14, via the axle body 70 of the attachment portion 68 attached to the distal end of the first arm 62 extending to the lower side from the rotation center portion 60.

The clamp member 74, which has a substantially trapezoid shape in a vehicle width direction view, is attached to the vehicle front side of an upper portion side of the first arm 62. The insertion portion 76 at the distal end of the clamp member 74 can be tightly fitted (inserted) into the recess portion 102 of the steering support 18.

That is, when the steering column 12 is at the driving position (the dead bottom point), the insertion portion 76 of the clamp member 74 is inserted (tightly fitted) into the recess portion 102 and the steering column 12 is put in the locked state (raising and lowering are disabled).

The abutting portion 72 is protrudingly formed at a diameter direction outer side of the upper side of the rotation center portion 60 of the link member 16.

A pair of rods 204 extend in the vehicle width direction. A pair of the steering support 18 are disposed at end portions of the rods 204 at the sides of the rods 204 at which the steering column 12 is disposed (vehicle width direction inner sides). A pair of support plates 206 are disposed at the vehicle width direction inner side end portions of the pair of rods 204. The actuator 14 is raised and lowered between the pair of support plates 206.

Operation and Effects of the Present Exemplary Embodiment

Now, operation and effects of the vehicle steering apparatus 200 according to the present exemplary embodiment are described.

First, raising of the steering column 12 from the driving state (the dead bottom point) to an embarkation and disembarkation state (the dead top point) is described.

Figure 10:
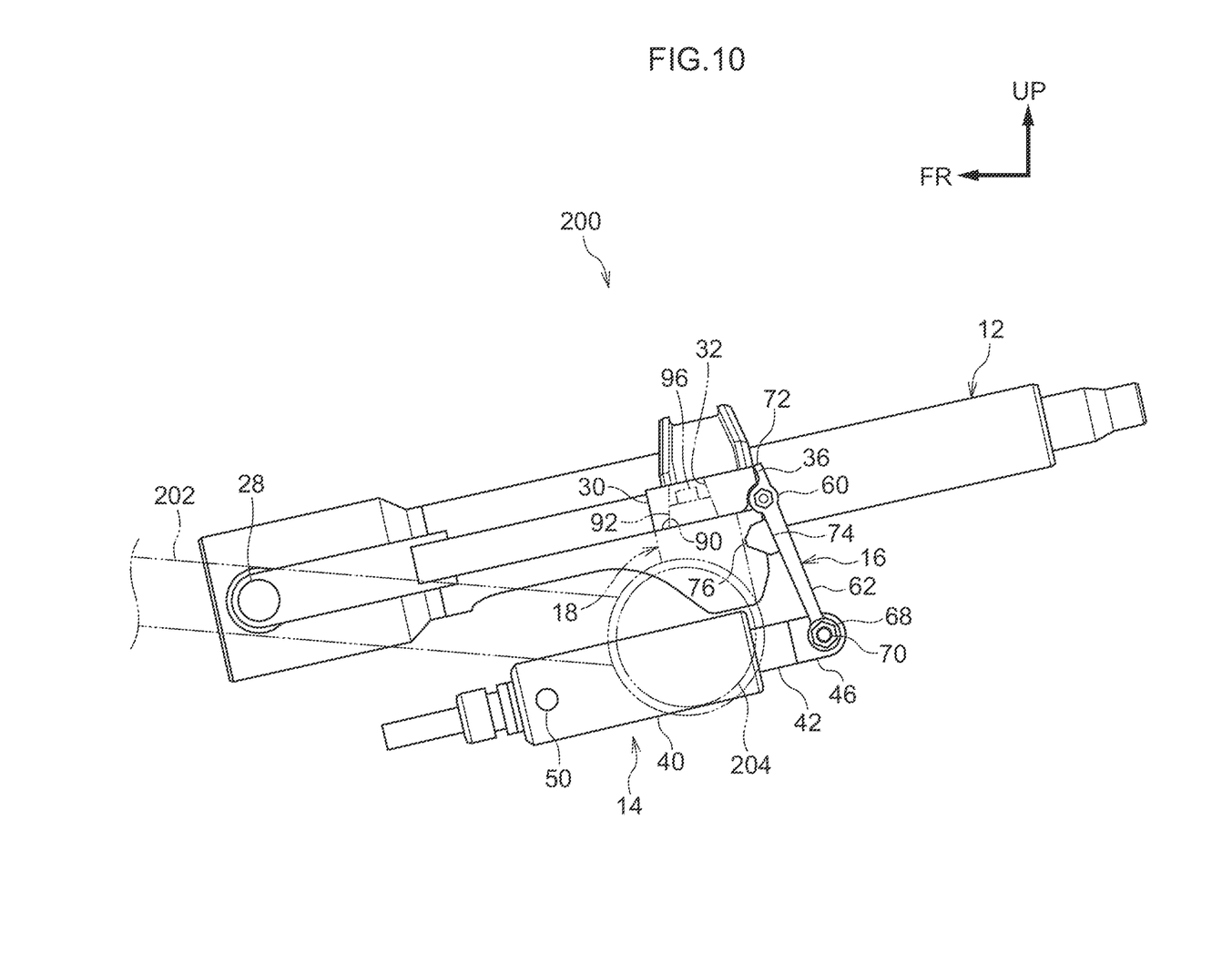
FIG. 10 is a side view showing a state in which the steering column of the vehicle steering apparatus according to the second exemplary embodiment is unlocked at the driving position (the dead bottom point)

When the actuator 14 of the vehicle steering apparatus 200 shown in FIG. 9 is driven and the rod 42 extends to the vehicle rear side as shown in FIG. 10, the link member 16, to which the attachment portion 68 is attached via the axle body 70, turns counterclockwise in the drawings about the rotation center portion 60 relative to the engaging portion 46 at the distal end of the rod 42. As a result, the insertion portion 76 of the clamp member 74 attached to the first arm 62 of the link member 16 disengages from the recess portion 102 of the steering support 18, unlocking the locked state of the steering column 12.

As shown in FIG. 10, the abutting portion 72 disposed at the upper side of the rotation center portion 60 of the link member 16 is abutted against the stopper portion 36 formed at the seating portion 30 of the steering column 12 by the extension of the rod 42 of the actuator 14, which stops the turning of the link member 16.

Figure 11:
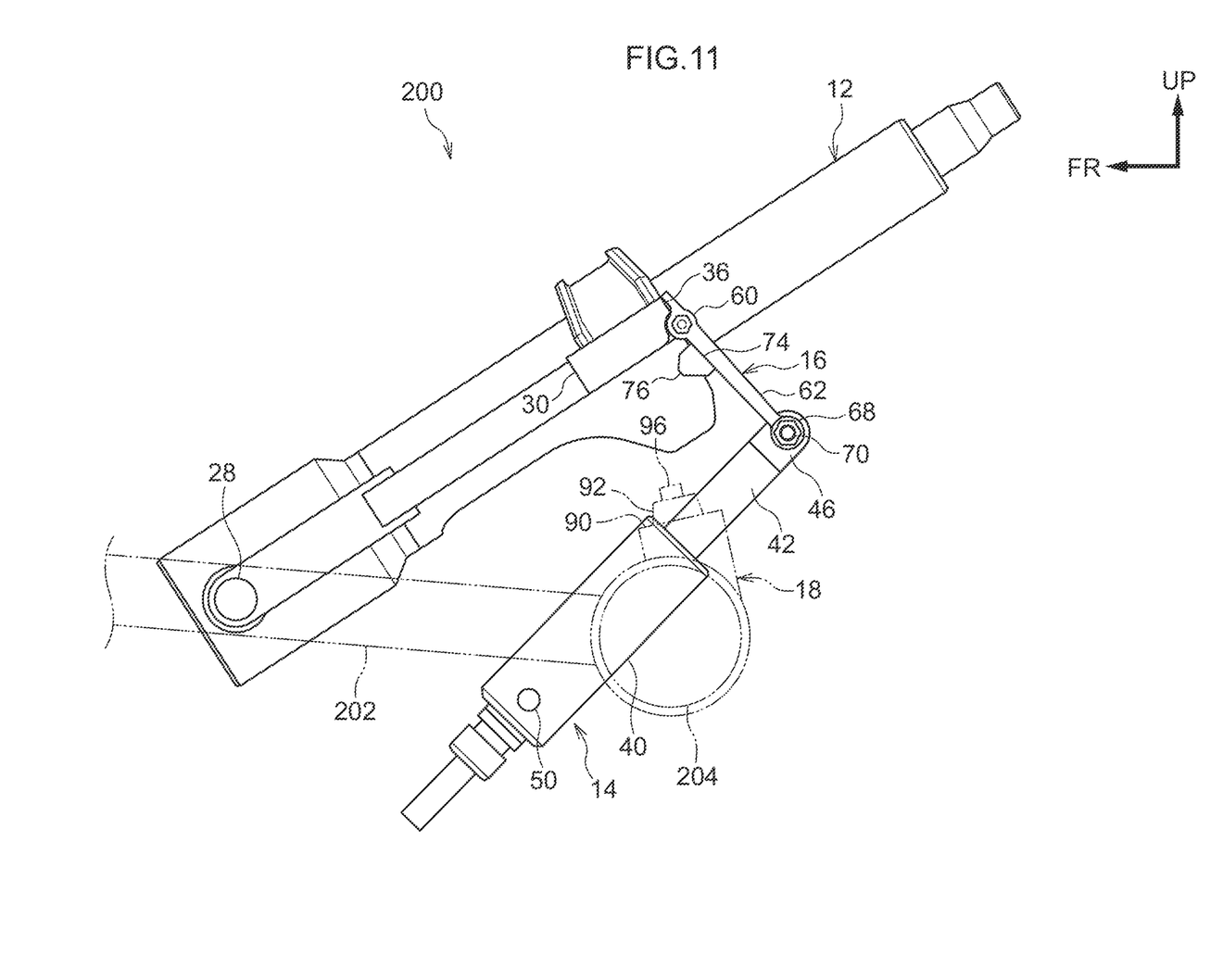
FIG. 11 is a side view showing the state in which the steering column of the vehicle steering apparatus according to the second exemplary embodiment is at the embarkation/disembarkation position (the dead top point).

Then, as shown in FIG. 11, the steering column 12 is turned counterclockwise in the drawings about the column swinging axle 28 by the extension of the rod 42 of the actuator 14 and is raised. At this time, the actuator 14 also rises about the actuator swinging axle 50.

Now, lowering of the steering column 12 from the embarkation and disembarkation state (the dead top point) to the driving state (the dead bottom point) is described.

When the actuator 14 of the vehicle steering apparatus 200 shown in FIG. 11 is operated and the rod 42 retracts to the vehicle front side as shown in FIG. 10, the steering column 12 is lowered. While the steering column 12 is being lowered, the abutting portion 72 of the link member 16 maintains the state of abutting against the stopper portion 36 of the steering column 12. Thus, the link member 16 does not turn.

When the seating portion 30 is seated on the flat face portion 90 of the steering support 18 by the lowering of the steering column 12, the taper cone 92 is inserted into the penetrating hole 32 of the seating portion 30, and the steering column 12 is positioned accurately to front, rear, left and right relative to the steering support 18.

After the steering column 12 has ceased turning, the link member 16 is turned clockwise in the drawings about the rotation center portion 60 by the retraction of the rod 42 of the actuator 14. Thus, the insertion portion 76 of the clamp member 74 attached to the first arm 62 enters (tightly fits) into the recess portion 102 of the steering support 18. Thus, the steering column 12 is locked.

In the vehicle steering apparatus 200, similarly to the vehicle steering apparatus 10 according to the first exemplary embodiment, locking and unlocking of the steering column 12 and raising and lowering operations of the steering column 12 may be implemented by the single actuator 14.

In addition, the steering column 12 may be positioned accurately to front, rear, left and right at the dead bottom point by the taper cone 92 attached to each steering support 18. Moreover, because the penetrating hole 32 is provided in the seating portion 30, at a time of assembly, the taper cone 92 may be assembled (fastened) to the flat face portion 90 of the steering support 18 precisely.

Alternatives

In the first exemplary embodiment, the steering support 18 and the guide member 20 are structured as separate members, but may be formed integrally.

In the second exemplary embodiment, no member (structure) corresponding to the guide member 20 of the first exemplary embodiment is provided, but this member may be provided.

In the first exemplary embodiment and the second exemplary embodiment, the penetrating hole 32 is provided at the steering column 12 side and the taper cone 92 is provided at the steering support 18 side, but the inverse of this configuration is possible. That is, structures are possible in which the taper cone 92 is provided at the steering column 12 side and the penetrating hole 32 is provided at the steering support 18 side.

Hereabove, exemplary embodiments are described, but it will be clear that numerous embodiments are possible within a scope not departing from the gist of the present disclosure.

What is claimed is:

1. A vehicle steering apparatus, comprising:
    a steering column that is supported swingably between a first position and a second position at a vehicle upper side relative to the first position;
    a link member that is supported by the steering column and is swingable relative to the steering column;
    an actuator including:
        a vehicle body side engaging portion that is engaged with a vehicle body side, and
        a link side engaging portion that is engaged with the link member, and
        when operated, the actuator changing a spacing between the vehicle body side engaging portion and the link side engaging portion, and swinging the steering column between the first position and the second position;
    a steering support that supports the steering column from the vehicle lower side in a state in which the steering column is disposed at the first position; and
    a clamp member provided at the link member, the clamp member being engaged with the steering support in the state in which the steering column is disposed at the first position, and the clamp member moving away from the steering support when the steering column is to swing from the first position toward the second position.

2. The vehicle steering apparatus according to claim 1, wherein, in a case in which operation of the actuator continues in a state in which the engagement of the clamp member with the steering support is completed, the link member deforms by bending.

3. The vehicle steering apparatus according to claim 1, wherein:
    one of a positioning protrusion portion or a positioning hole portion is provided at the steering support and the other of the positioning protrusion portion or the positioning hole portion is provided at the steering column, the positioning protrusion portion being formed in one of a truncated cone shape or a cone shape, which shape tapers toward a distal end side of the positioning protrusion portion in a protrusion direction thereof, and an inner periphery edge of the positioning hole portion being formed in a circular shape, and when the steering column swings from the second position side toward the first position, the positioning protrusion portion enters into the positioning hole portion.

4. The vehicle steering apparatus according to claim 1, further comprising:
   a guide member including a guide face that is disposed so as to oppose a portion of the link member when the steering column is swinging between the first position and the second position; and
   a swinging restriction portion provided at the link member,
   wherein, in a state in which the steering column is disposed between the first position and the second position, the swinging restriction portion abuts against the guide face and swinging of the steering column is restricted.

5. The vehicle steering apparatus according to claim 4, wherein:
   the guide member includes a stopper portion that is disposed so as to oppose the swinging restriction portion when the steering column is disposed at the second position, and
   the swinging restriction portion abuts against the stopper portion and restricts swinging of the steering column toward an opposite side of the second position from a side thereof at which the first position is located.

6. The vehicle steering apparatus according to claim 1, wherein the first position is a bottom dead point in a driving state and the second position is a top dead point in an embarkation and disembarkation state.

* * * * *